(12) United States Patent  (10) Patent No.: US 10,776,768 B2
Yamamoto                   (45) Date of Patent:    Sep. 15, 2020

(54) ARTICLE RECOGNITION DEVICE AND COMMODITY SETTLEMENT DEVICE

(71) Applicant: TOSHIBA TEC KABUSHIKI KAISHA, Tokyo (JP)

(72) Inventor: Naofumi Yamamoto, Kawasaki Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 77 days.

(21) Appl. No.: 16/239,334

(22) Filed: Jan. 3, 2019

(65) Prior Publication Data

US 2019/0228398 A1 Jul. 25, 2019

(30) Foreign Application Priority Data

Jan. 25, 2018 (JP) .................. 2018-010640

(51) Int. Cl.
*G06K 9/00* (2006.01)
*G06Q 20/20* (2012.01)
(Continued)

(52) U.S. Cl.
CPC ....... *G06Q 20/208* (2013.01); *G06K 7/10722* (2013.01); *G06K 7/1413* (2013.01);
(Continued)

(58) Field of Classification Search
CPC ............ G06Q 20/208; G06Q 30/0281; G06K 7/10722; G06K 7/1413; G06K 9/00624; G06K 9/00771; G06K 9/46; G06K 9/6211; G06K 9/6215; G06K 19/06028; G06K 9/00778; G06K 9/00993; G06K 9/03; G06K 9/6202; G06K 9/00221; G06K 9/00335; G06K 9/00369; G06K 9/627; G06K 9/00718; G06K 9/6256; G06K 9/62; G06K 2209/21; G06F 3/011; G06F 3/0304; G06F 16/2264; G06F 16/9024; G06F 3/0346;
(Continued)

(56) References Cited

U.S. PATENT DOCUMENTS 10,282,852 B1 * 5/2019 Buibas .................... G06T 7/246
2015/0039458 A1 * 2/2015 Reid .................. G06K 9/00771
                                                        705/26.1
(Continued)

*Primary Examiner* — Duy M Dang
(74) *Attorney, Agent, or Firm* — Kim & Stewart LLP

(57) ABSTRACT

An article recognition device includes a table, a camera that captures an image of a predetermined area on the table, a memory that stores dictionary information indicating a predetermined set of feature points of each article, and a processor. The processor extracts feature points of the articles in the captured image, identifies a first article by reading identification information in the captured image, acquires the predetermined set of feature points of the identified article, specifies an article area of the first article in the captured image based on the extracted feature points and the predetermined set, removes feature points within the specified article area from the extracted feature points, and recognizes a second article based on the extracted feature points where the feature points within the specified article area have been removed and the predetermined set of feature points of the second article stored in the dictionary information.

20 Claims, 6 Drawing Sheets

(51) Int. Cl.
*G06K 7/14* (2006.01)
*G06K 19/06* (2006.01)
*G06K 9/62* (2006.01)
*G06K 9/46* (2006.01)
*G06K 7/10* (2006.01)

(52) U.S. Cl.
CPC ..... *G06K 9/00624* (2013.01); *G06K 9/00771* (2013.01); *G06K 9/46* (2013.01); *G06K 9/6211* (2013.01); *G06K 9/6215* (2013.01); *G06K 19/06028* (2013.01)

(58) Field of Classification Search
CPC ...... A63F 13/213; A63F 13/24; A63F 13/426; A63F 13/428; A63F 13/655; A63F 13/00; G06T 7/73; G06N 3/04; G06N 3/08; G06N 3/02; H04N 7/181; H04N 5/2226; G08C 17/00; G08C 17/02; G08B 13/196; G08B 13/19608; G08B 13/19606; B64C 39/024; B64C 2201/00; G05D 1/0033; G05D 1/0038; G05D 1/0044; G05D 1/0231; G05D 1/0214; G05D 1/0212; A61B 2034/2065; B60T 2210/00; B60T 2210/30; B60T 2210/32; G08G 1/0968; G01C 21/3626; B60R 11/02; B60R 21/00
See application file for complete search history.

(56) References Cited

U.S. PATENT DOCUMENTS

2016/0180315 A1\* 6/2016 Kanamori .......... G01G 19/4144
705/23
2017/0193319 A1 7/2017 Yasunaga \* cited by examiner

ARTICLE RECOGNITION DEVICE AND COMMODITY SETTLEMENT DEVICE

CROSS-REFERENCE TO RELATED APPLICATION

This application is based upon and claims the benefit of priority from Japanese Patent Application No. 2018-010640, filed on Jan. 25, 2018, the entire contents of which are incorporated herein by reference.

FIELD

Embodiments described herein relate generally to an article recognition device and a commodity settlement device.

BACKGROUND

Some article recognition devices use an image recognition technique for registering an article to be purchased by a shopper when failing to identify the article by reading its identification information such as a barcode. To improve the recognition rate of the image recognition, such article recognition devices capture an image of a plurality of articles and perform the image recognition with respect to the captured image in areas other than an area where the article has been identified by the identification information attached to the article.

However, the conventional devices may fail to specify such a commodity area identified by the identification information. As a result, the recognition rate of the subsequent image recognition may not be improved.

DETAILED DESCRIPTION

Embodiments provide an article recognition device and a commodity settlement device capable of appropriately recognizing an article.

An article recognition device according to an embodiment includes a table, a camera, a memory, and a processor. The camera captures an image of a predetermined area on the table. The memory stores dictionary information indicating a predetermined set of feature points of each of a plurality of articles. The processor extracts a plurality of feature points of the articles shown in the captured image, identifies a first article by reading identification information included in the captured image, acquires the predetermined set of feature points of the identified first article from the stored dictionary information, specifies an article area of the first article in the captured image based on the extracted feature points and the predetermined set of feature points, removes one or more feature points within the specified article area from the extracted feature points, and recognizes a second article, identification information of which is not included in the captured image, based on the extracted feature points where the feature points within the specified article area have been removed and the predetermined set of feature points of the second article stored in the dictionary information.

In the following, a plurality of embodiments will be described with reference to the drawings.

A checkout device (more generally, article recognition device or commodity settlement device) according to the embodiments executes settlement processing on a commodity. The checkout device recognizes the commodity from the captured image of the commodity and executes settlement processing on the commodity. The checkout device is installed in a store or the like that sells the commodity. For example, the checkout device executes settlement processing on a commodity in a case where the commodity is placed at a predetermined position or a case where the checkout device receives a predetermined operation. The checkout device may be installed as a self-service checkout machine which performs settlement processing by the user himself/herself. The checkout device may be installed as an ordinary checkout machine that a clerk of a store performs settlement processing.

Figure 1:
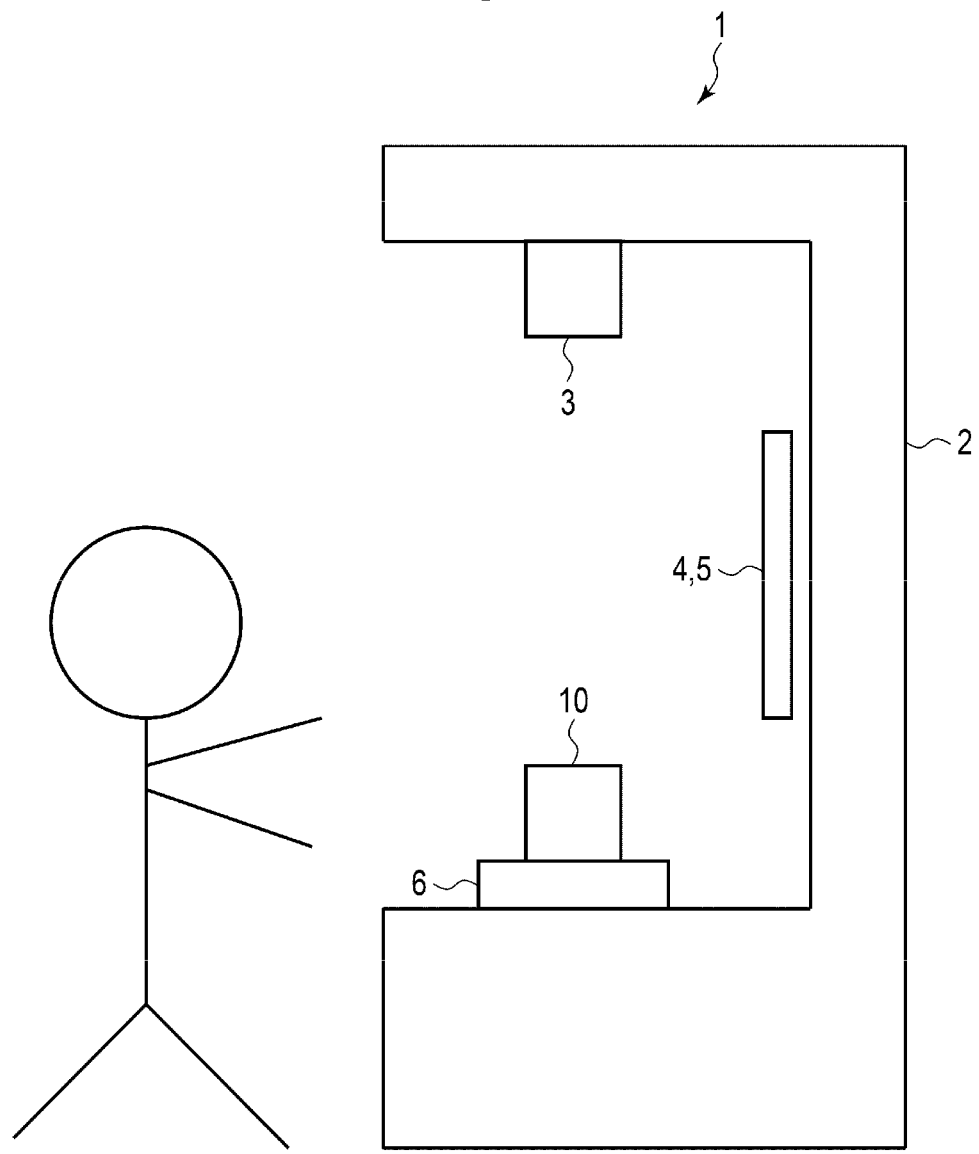
FIG. 1 is a schematic diagram of a checkout device according to one or more embodiments.

FIG. 1 is a schematic diagram of a checkout device 1 according to one or more embodiments. As illustrated in FIG. 1, the checkout device 1 includes a casing 2, a camera 3, a display 4, an operation unit 5, a table 6, and the like.

The casing 2 is a frame forming the outer shape of the checkout device 1. The casing 2 is formed so that a commodity 10 can be installed. In the example illustrated in FIG. 1, the casing 2 is U-shaped and is formed so as to be able to load the commodity 10.

The camera 3 captures an image of the commodity 10 on the table 6. In the example illustrated in FIG. 1, the camera 3 is installed so as to capture an image of the table 6 from above. The camera 3 may be installed so as to capture the image of the table 6 from obliquely above. The position and direction in which the camera 3 is installed are not limited to a specific configuration.

The checkout device 1 may include a plurality of cameras 3. In this case, the plurality of cameras 3 may be installed so as to capture images of commodities on the table 6 at different positions and angles.

For example, the camera 3 is a CCD camera or the like. The camera 3 may be for taking invisible light. The configuration of the camera 3 is not limited to a specific configuration.

The display 4 is a display device that displays an image output by a processor 21 described later. The display 4 is, for example, a liquid crystal monitor or the like.

Various operation instructions are input to the operation unit 5 by a user of the checkout device 1. The operation unit 5 transmits data of an operation instruction input by the user, to the processor 21. The operation unit 5 is, for example, a keyboard, a ten-key pad, a touch panel, or the like. The operation unit 5 may receive input of a gesture from the user.

Here, it is assumed that the operation unit 5 is a touch panel, which is integrally formed with the display 4.

The table 6 is a table on which the commodity 10 is placed. The table 6 is installed on the casing 2 at a location where the user can place the commodity 10. The table 6 may be provided with a sensor for detecting that the commodity 10 has been placed. The sensor transmits a signal to the processor 21 indicating that the commodity 10 has been placed.

The commodity 10 is a commodity on which the settlement processing is being executed. The commodity 10 has identification information on a predetermined surface. The identification information is information for specifying the commodity 10. For example, the identification information may be a barcode, QR code (registered trademark), one or more letters, one or more numbers, one or more marks, or the like. Here, it is assumed that the identification information is a barcode. The barcode is an encoded commodity code for specifying the commodity 10. The commodity 10 may or may not have identification information.

The camera 3, the display 4, the operation unit 5, or the table 6 may be formed integrally with the casing 2. The checkout device 1 may be provided with lighting or the like for illuminating the commodity 10.

Next, a configuration example of the checkout device 1 will be described.

Figure 2:
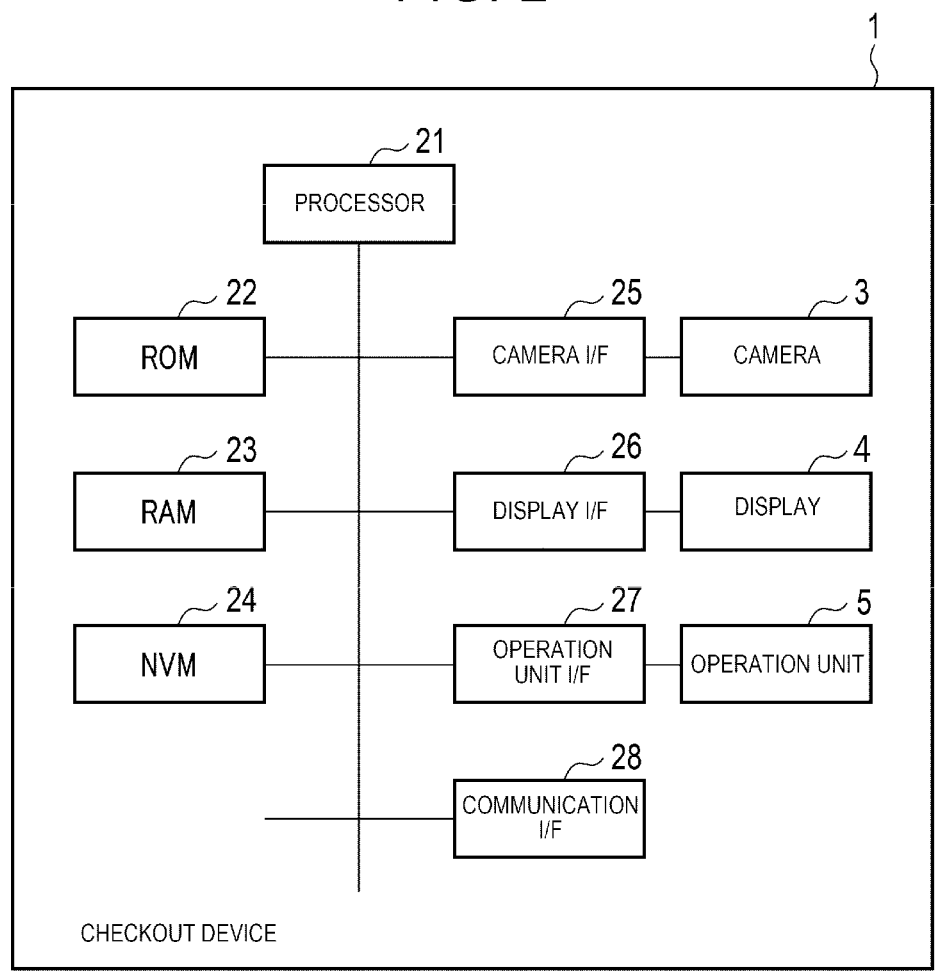
FIG. 2 is a block diagram of the checkout device according to one or more embodiments.

FIG. 2 is a block diagram of the checkout device 1 according to one or more embodiments.

As illustrated in FIG. 2, the checkout device 1 includes the camera 3, the display 4, the operation unit 5, the processor 21, a read-only memory (ROM) 22, a random-access memory (RAM) 23, a non-volatile memory (NVM) 24, a camera interface 25, a display interface 26, an operation unit interface 27, and a communication interface 28. The processor 21, the ROM 22, the RAM 23, the NVM 24, the camera interface 25, the display interface 26, the operation unit interface 27, and the communication interface 28 are connected to each other via a data bus or the like.

The camera interface 25 and the camera 3 are connected to each other via the data bus or the like. The display interface 26 and the display 4 are connected to each other via the data bus or the like. The operation unit interface 27 and the operation unit 5 are connected to each other via the data bus or the like.

The checkout device 1 may have other components in addition to the configuration as illustrated in FIG. 2, and one or more components shown in FIG. 2 may be omitted.

The camera 3, the display 4 and the operation unit 5 are as described above.

The processor 21 has a function of controlling the operation of the entire checkout device 1. The processor 21 may include an internal memory and various interfaces. The processor 21 performs various functions by executing programs stored in the internal memory, the ROM 22, the NVM 24 or the like in advance.

Some of the functions performed by the processor 21 executing programs may be realized by a hardware circuit. In this case, the processor 21 controls functions executed by the hardware circuit.

The ROM 22 is a nonvolatile memory in which a control program and control data are stored in advance. The ROM 22 is incorporated in the checkout device 1 and a control program, control data and the like are stored therein at the manufacturing stage. That is, the control program and the control data stored in the ROM 22 are incorporated in the checkout device 1 in advance according to a specification of the checkout device 1.

The RAM 23 is a volatile memory. The RAM 23 temporarily stores data being processed by the processor 21 and the like. The RAM 23 stores various application programs based on instructions from the processor 21. Further, the RAM 23 may store data necessary for executing the application program, an execution result of the application program, and the like.

The NVM 24 is a nonvolatile memory in which data can be written and rewritten. The NVM 24 may be, for example, a hard disk drive (HDD), a solid state drive (SSD), an EEPROM (registered trademark) or a flash memory. The NVM 24 stores a control program, an application, various data, and the like according to the operation purpose of the checkout device 1.

The NVM 24 stores commodity information. The commodity information is information about the commodity. The commodity information includes the commodity code, the dictionary information, and outer shape information in association with each other.

The dictionary information is information for specifying a commodity using a local feature value. The dictionary information includes a feature point and a feature value of a commodity image. For example, the positions and feature values of a plurality of feature points are stored in association with each other as a feature point set in the dictionary information.

The outer shape information indicates an outer shape of the commodity in the coordinate system of the feature point of the dictionary information. For example, the outer shape information indicates the coordinates of the four corners of the commodity.

The commodity information may include outer dimensions of a commodity, a commodity name, and a commodity price. A configuration of the commodity information is not limited to a specific configuration.

The NVM 24 stores the commodity information on each commodity in advance. For example, the processor 21 receives commodity information from an external device via the communication interface and stores the commodity information in the NVM 24. The commodity information may be updated as appropriate.

The camera interface 25 is an interface through which the processor 21 communicates with the camera 3. For example, the processor 21 transmits a signal that causes the camera 3 to acquire an image through the camera interface 25. In addition, the processor 21 may set camera parameters for capturing in the camera 3 through the camera interface 25.

The camera interface 25 acquires an image captured by the camera 3. The camera interface 25 transmits the acquired image to the processor 21. The processor 21 acquires the image captured by the camera 3 from the camera interface 25.

The display interface 26 is an interface through which the processor 21 communicates with the display 4. For example, the processor 21 controls the display 4 to display a display screen through the display interface 26.

The operation unit interface 27 is an interface through which the processor 21 communicates with the operation unit 5. For example, the processor 21 receives a signal indicating an operation input to the operation unit 5 through the operation unit interface 27.

The communication interface 28 is an interface for transmitting and receiving data to and from external devices. For example, the communication interface 28 transmits and receives data to and from external devices via a network such as a local area network (LAN). Further, the communication interface 28 may be an interface supporting USB connection.

Next, the functions performed by the checkout device 1 will be described. The functions are performed by the processor 21 executing a program stored in the NVM 24 or the like.

First, the processor 21 has a function of acquiring an image obtained by capturing an image of a predetermined place where a commodity is placed. Here, the processor 21 acquires an image obtained by capturing a commodity placed on the table 6.

For example, the processor 21 detects that the commodity 10 is placed by the user on the table 6. For example, the processor 21 detects that the commodity 10 is placed on the table 6 based on a signal from the table 6. The processor 21 may detect that the commodity 10 is placed on the table 6 based on an image from the camera 3. Further, the processor 21 may detect a user operation indicating that the commodity 10 is placed on the table 6.

When it is detected that the commodity 10 is placed, the processor 21 controls the camera 3 to capture an image including the commodity 10. For example, the processor 21 transmits a signal for capturing to the camera 3. The processor 21 acquires a captured image from the camera 3. The processor 21 may set the capturing parameters in the camera 3 in order to capture an image.

The processor 21 may acquire a captured image from an external device.

Figure 3:
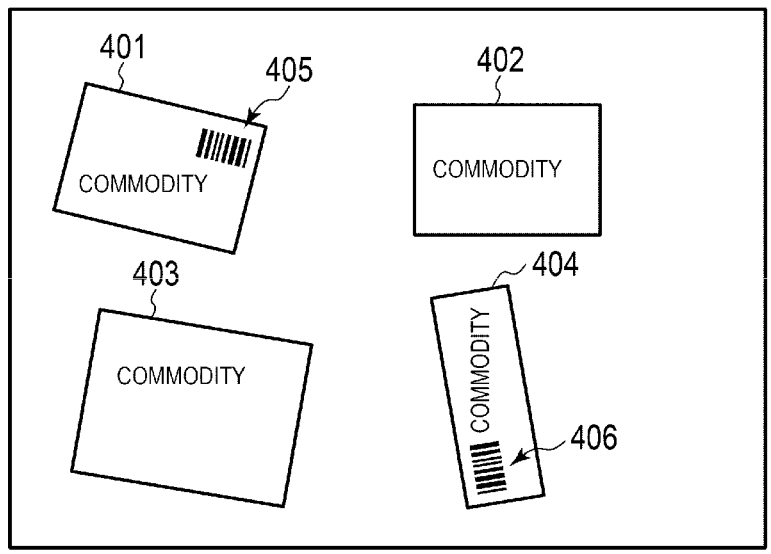
FIG. 3 illustrates a captured image according to one or more embodiments.

FIG. 3 illustrates an example of the captured image. In the example illustrated in FIG. 3, commodities 401 to 404 are shown in the captured image. The commodity 401 is placed such that a barcode 405 is on the upper surface. A barcode 405 is identification information indicating the commodity 401. In addition, the commodities 402 and 403 are placed in an orientation in which the barcodes are not on the upper surface. The commodities 402 and 403 may be commodities to which no barcode is attached.

The commodity 404 is placed so that the barcode 406 is on the upper surface. A barcode 406 is identification information indicating the commodity 404.

The processor 21 has a function of extracting feature point information from the captured image.

That is, the processor 21 extracts the feature points of the commodities from the captured image and calculates the feature value of each feature point. The feature point information includes information such as the feature point and the feature value.

For example, the feature point is a point uniquely determined within a local area such as a point at a corner portion of the image or extreme points (i.e., maximal and minimal points) of a second derivative function of image density. The feature point is indicated by coordinates (x,y) representing a position in the captured image.

The feature value is a value calculated from an image of the feature point or around the feature point. For example, the feature value is calculated based on a density pattern or the like in the vicinity of the feature point.

Further, the feature point information may include information such as a scale or orientation indicating a size and direction of the image for calculating the feature value.

The configuration of the feature point information is not limited to a specific configuration.

The processor 21 stores extracted feature point information in the feature point list.

Figure 4:
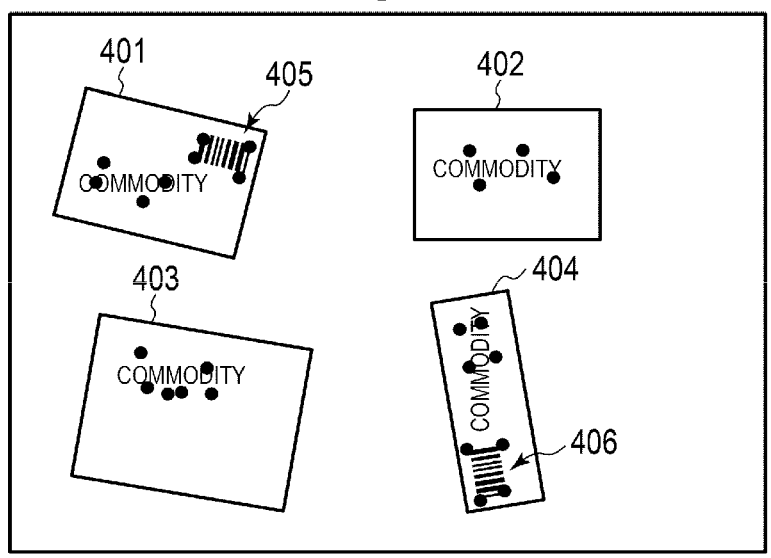
FIGS. 4 and 5 each illustrate feature points extracted from the captured image according to one or more embodiments.

FIG. 4 illustrates a plurality of feature points extracted by the processor 21. In FIG. 4, black dots indicate feature points. As illustrated in FIG. 4, feature points are extracted on the commodities 401 to 404. For example, the black dots 405 is extracted on the commodity 401.

The processor 21 has a function of reading the identification information of the captured image and recognizing the commodity. Here, the processor 21 reads the barcode as identification information from the captured image.

For example, the processor 21 extracts a barcode area in which a barcode is taken by predetermined image processing. When the barcode area is specified, the processor 21 decodes the barcode in the barcode area. That is, the processor 21 reads the commodity code that specifies the commodity from the barcode. The processor 21 recognizes the commodity from which the commodity code is read.

The processor 21 stores the commodity code and the position of the barcode area in association with each other in a detection barcode list.

The processor 21 may determine whether the commodity code is included in any of pieces of commodity information stored in the NVM 24. The processor 21 may store the commodity code included in any of the pieces of commodity information and the position of the barcode area in the detection barcode list.

The processor 21 has a function of specifying a commodity area in which the commodity, for which the identification information is read, is taken from the captured image.

The processor 21 specifies the commodity area based on the feature point information of the feature point list. For example, the processor 21 acquires the commodity information including the commodity code obtained from the barcode from the NVM 24. When the commodity information is acquired, the processor 21 acquires the dictionary information of the commodity information.

The processor 21 matches the feature point information of the feature point list and the dictionary information. For example, the processor 21 extracts the feature points closest to a feature point set of the dictionary information from the feature point list. That is, the processor 21 extracts feature points corresponding to the feature point set from the feature point list.

The processor 21 may extract feature points corresponding to the feature point set from the feature points which are within a predetermined distance from the barcode area or which are set based on the position of the barcode area.

When the feature points closest to the feature point set are extracted, the processor 21 calculates a transformation matrix M that superimposes the feature points of the feature point set most frequently on the extracted feature points. The transformation matrix M represents a transformation matrix from the coordinate system of a dictionary feature point to the coordinate system of the feature point of the commodity image. When the transformation matrix M is calculated, the processor 21 calculates a similarity ratio R of both feature points based on the transformation matrix M. For example, the processor 21 sets a value obtained by dividing the number of feature points whose positions coincide with each other (or that both feature points are within a predetermined distance) in a case of converting the coordinates of the feature point set by the transformation matrix M by the number of feature point sets as the similarity ratio R.

When the similarity ratio R is calculated, the processor 21 determines whether the similarity ratio R exceeds a predetermined threshold value Rthr. The threshold value Rthr is a threshold value for determining that both feature points are matched (i.e., the commodity is recognized).

When it is determined that the similarity ratio R exceeds the threshold value Rthr, the processor 21 specifies the commodity area based on outer shape information of the commodity information. For example, the processor 21 calculates the coordinates of the commodity area by multiplying the coordinate of the outer shape information by the transformation matrix M.

The processor 21 calculates the coordinates of the commodity area according to the following expressions.

$$P1(x,y) = M \cdot Pd1(x,y)$$

$$P2(x,y)=M \cdot Pd2(x,y)$$

$$P3(x,y)=M \cdot Pd3(x,y)$$

$$P4(x,y)=M \cdot Pd4(x,y)$$

Here, P1(x,y), P2(x,y), P3(x,y), and P4 (x, y) are the coordinates of outer shape information of the commodity information.
Here, the outer shape information indicates the coordinates of the four corners,
in the coordinate system of camera image.
Pd1(x,y), Pd2(x,y), Pd3(x,y) and Pd4(x,y) indicates the coordinates of the four corners of the commodity area, in the coordinate system of the dictionary.

The processor 21 determines whether a barcode area is present in a specified commodity area. In a case where the barcode area is not present in the commodity area, the processor 21 determines that specification of the commodity area is failed. The processor 21 may control the display 4 to output an error if the processor 21 fails to specify the commodity area.

The processor 21 has a function of deleting feature point information within the commodity area from the feature point list.

The processor 21 determines whether the feature point of each piece of feature point information in the feature point list is within the commodity area. The processor 21 deletes the feature point information of the feature point determined as being within the commodity area from the feature point list.

Figure 5:
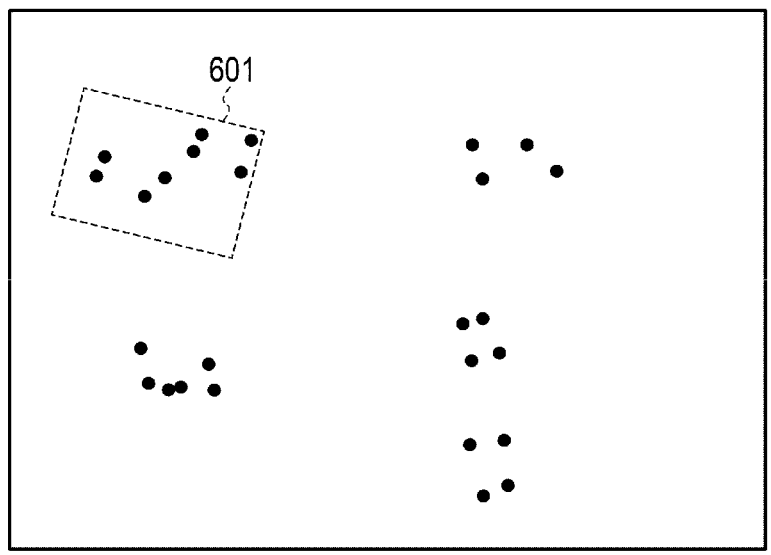

FIG. 5 illustrates a plurality of feature points in which the processor 21 deletes the feature point information. In FIG. 5, it is assumed that the processor 21 reads the barcode and recognizes the commodity 401. The processor 21 specifies a commodity area 601 of the commodity 401 from the feature point information of the feature point list and the like. When the commodity area 601 is specified, the processor 21 deletes the feature point information in the commodity area 601.

The processor 21 performs the operation described above for each commodity recognized by reading the barcode.

Further, the processor 21 has a function of recognizing a commodity from a remaining feature point list. That is, the processor 21 recognizes the commodity from feature points outside the commodity area identified using the identification information.

The processor 21 acquires one piece of commodity information from the NVM 24. When the commodity information is acquired, the processor 21 calculates the similarity ratio R of the feature point set based on the feature point set of the commodity information and the feature point list. The calculation method of the similarity ratio R is as described above.

The processor 21 calculates the similarity ratio R for each piece of commodity information stored in the NVM 24. When the similarity ratio R of each piece of commodity information is calculated, the processor 21 specifies the highest similarity ratio Rmax from among the similarity ratios R. When the similarity ratio Rmax is specified, the processor 21 determines whether the similarity ratio Rmax exceeds the threshold value Rthr. When it is determined that the similarity ratio Rmax exceeds the threshold value Rthr, the processor 21 recognizes the commodity corresponding to the commodity information having the similarity ratio Rmax. When the commodity is recognized, the processor 21 specifies the commodity area of the recognized commodity based on the transformation matrix Mmax with which the similarity ratio Rmax is calculated.

For example, the processor 21 calculates the coordinates of the commodity area by multiplying the coordinates of the outer shape information of the recognized commodity by the transformation matrix Mmax.

The processor 21 calculates the coordinates of the commodity area according to the following expressions.

$$P1(x,y)=M\max \cdot Pd1(x,y)$$

$$P2(x,y)=M\max \cdot Pd2(x,y)$$

$$P3(x,y)=M\max \cdot Pd3(x,y)$$

$$P4(x,y)=M\max \cdot Pd4(x,y)$$

Here, Pd1 (x, y), Pd2 (x, y), Pd3 (x, y), and Pd4 (x, y) are the coordinates of the outer shape information of the commodity information is there. Here, the outer shape information indicates the coordinates of the four corners. P1 (x, y), P2 (x, y), P3 (x, y) and P4 (x, y) indicate the coordinates of the four corners of the commodity area.

When the commodity area is specified, the processor 21 deletes the feature point information in the commodity area from the feature point list.

The processor 21 repeats the operation described above until the similarity ratio Rmax becomes equal to or less than the threshold value Rthr, and recognizes the commodity of the commodity image.

Further, the processor 21 has a function of settling the recognized commodity.

The processor 21 acquires a price from the commodity information of the recognized commodity or the like. The processor 21 may acquire the price of the recognized commodity from the external device.

The processor 21 executes settlement processing on the commodity based on the price of the commodity. For example, the processor 21 detects input of credit card information from the user via the operation unit 5. For example, the processor 21 may acquire the credit card information using a credit card reader or the like. The processor 21 executes settlement processing on the commodity based on the credit card information.

The processor 21 may execute settlement processing on the commodity using cash, debit card, electronic money, or the like. The method by which the processor 21 executes settlement processing on the commodity is not limited to a specific method.

Next, an operation example of the checkout device 1 will be described.

Figure 6:
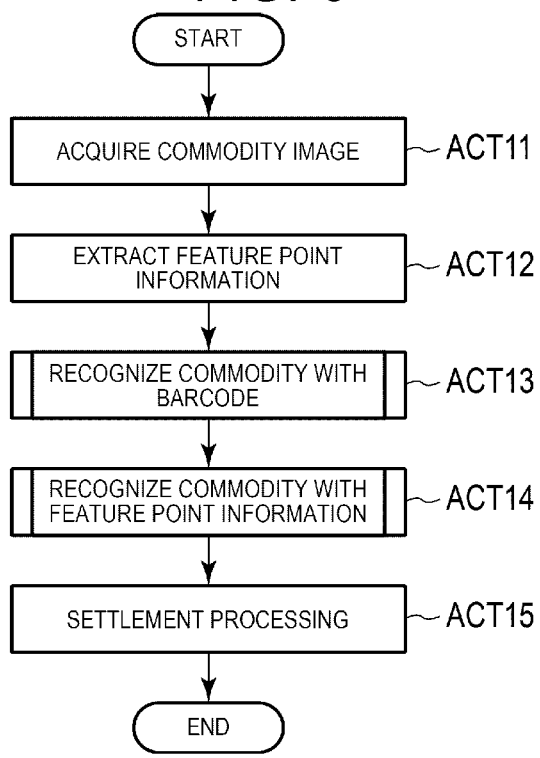
FIGS. 6-8 each illustrate a flowchart of a method carried out by the checkout device according to one or more embodiments.

FIG. 6 is a flowchart for explaining an operation example of the checkout device 1. Here, it is assumed that the user sets the commodity on the table 6.

First, the processor 21 controls the camera 3 to acquire a commodity image (ACT 11). When the commodity image is acquired, the processor 21 extracts feature point information from the commodity image and stores the feature point information in the feature point list (ACT 12).

When the feature point information is stored in the feature point list, the processor 21 reads the barcode from the captured image and recognizes the commodity (ACT 13). When the barcode is read and the commodity is recognized, the processor 21 recognizes the commodity using the feature point information (ACT 14).

When the commodity is recognized using the feature point information, the processor 21 executes settlement processing on the commodity recognized in ACT 13 and ACT 14 (ACT 15). When the processor 21 has executed the settlement processing on the commodity, the processor 21 ends the operation.

Next, an operation example (ACT 13) in which the processor 21 reads the barcode and recognizes the commodity will be described.

Figure 7:
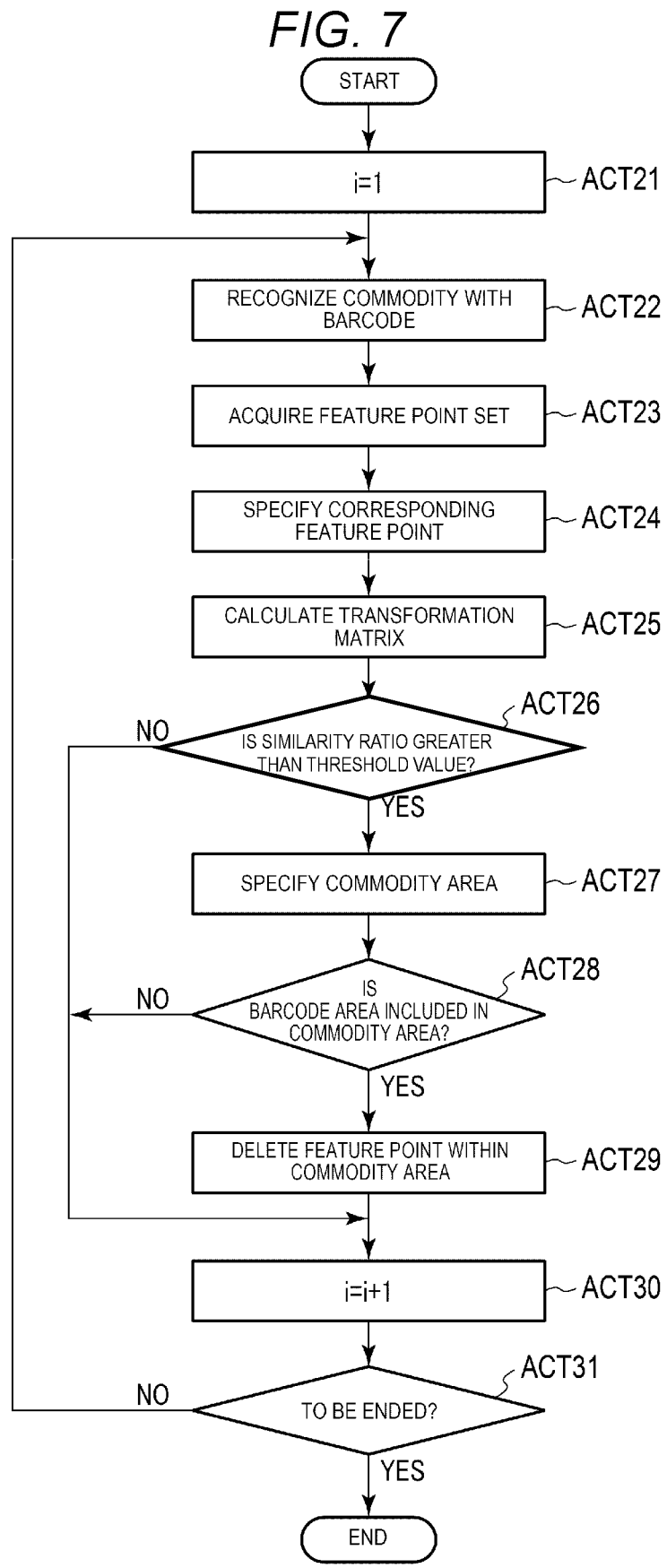

FIG. 7 is a flowchart for explaining an operation example in which the processor 21 reads the barcode and recognizes the commodity.

First, the processor 21 resets i (ACT 21). That is, the processor 21 sets i=1. When i is reset, the processor 21 reads the barcode from one barcode area and recognizes the commodity (ACT 22).

When the commodity is recognized, the processor 21 acquires a feature point set from the commodity information of the commodity (ACT 23). When the feature point set is acquired, the processor 21 specifies one or more feature points corresponding to the feature point set from the feature point list (ACT 24).

When the corresponding feature points are specified, the processor 21 calculates the transformation matrix M (ACT 25). When the transformation matrix M is calculated, the processor 21 determines whether the similarity ratio R using the transformation matrix M exceeds the threshold value Rthr (ACT 26).

When it is determined that the similarity ratio R exceeds the threshold value Rthr (YES in ACT 26), the processor 21 specifies the commodity area based on the corresponding feature points and the like (ACT 27). When the commodity area is specified, the processor 21 determines whether the barcode area is included in the commodity area (ACT 28).

When it is determined that the barcode area is included in the commodity area (YES in ACT 28), the processor 21 deletes the feature point information of the corresponding feature points from the feature point list (ACT 29). When the feature point information is deleted, the processor 21 increments i (ACT 30).

When i is incremented, the processor 21 determines whether i exceeds Nb (ACT 31). Here, Nb is the number of specified barcode areas.

When it is determined that i is equal to or less than Nb (NO in ACT 31), the processor 21 returns to ACT 22.

When it is determined that the similarity ratio R is equal to or less than the threshold value Rthr (NO in ACT 26), or when it is determined that the barcode area is not included in the commodity area (YES in ACT 28), the processor 21 proceeds to ACT 30.

When it is determined that i exceeds Nb (YES in ACT 31), the processor 21 ends the operation.

When it is determined that the similarity ratio R is equal to or less than the threshold value Rthr (NO in ACT 26), or when it is determined that the barcode area is not included in the commodity area (NO in ACT 28), the processor 21 may end the operation.

Next, an operation example (ACT 14) in which the processor 21 recognizes the commodity using the feature point information will be described.

Figure 8:
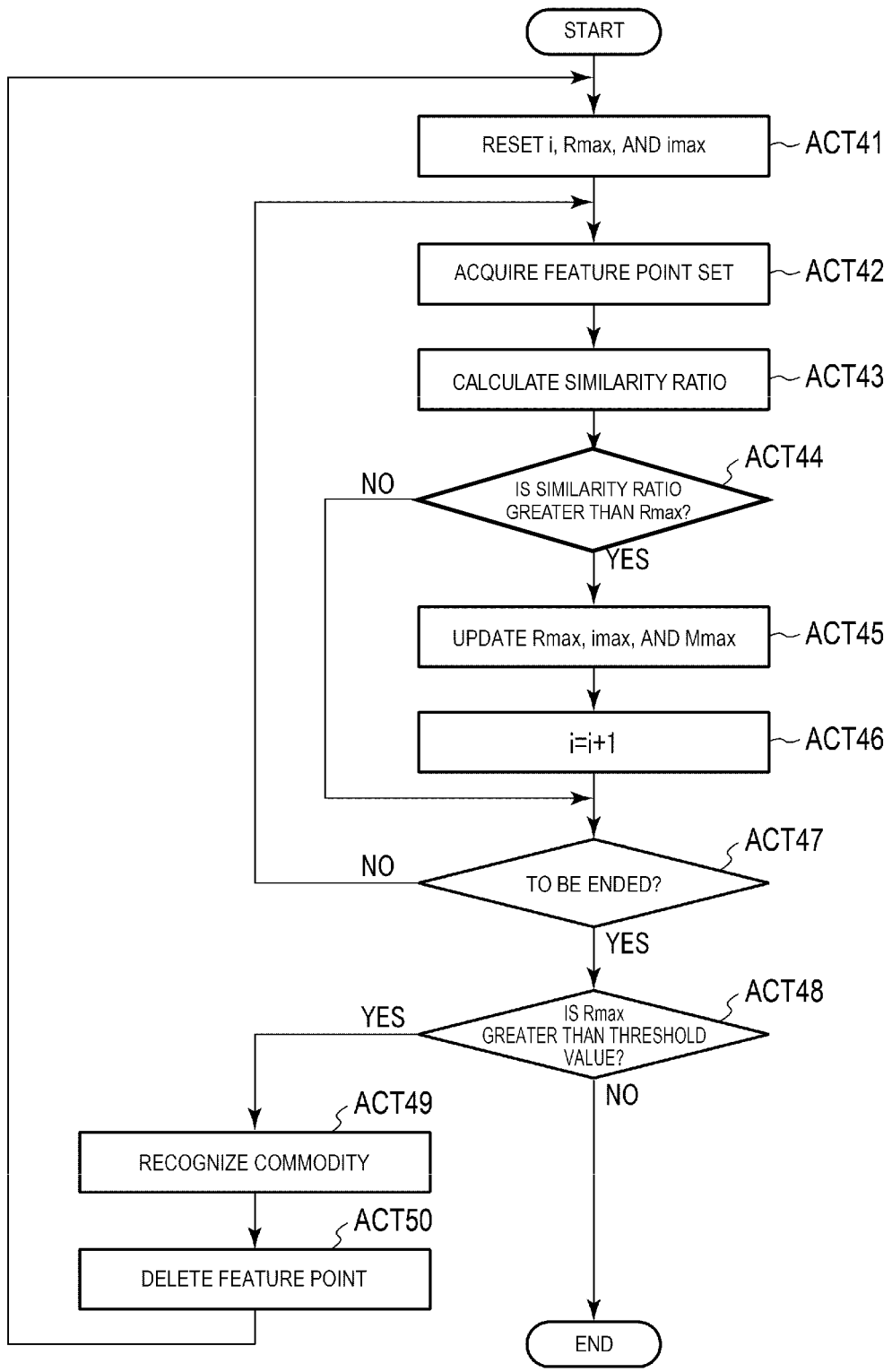

FIG. 8 is a flowchart for explaining an operation example in which the processor 21 recognizes the commodity using the feature point information.

First, the processor 21 resets i, Rmax, and imax (ACT 41). That is, the processor 21 sets i=1, Rmax=0, and imax=0. When i, Rmax, and imax are reset, the processor acquires a feature point set from i-th commodity information (ACT 42). Here, i indicates the number of pieces of commodity information stored in the NVM 24 in a predetermined order.

When the feature point set is acquired, the processor 21 calculates the transformation matrix M and calculates a similarity ratio R between the corresponding feature points of the feature point set and the feature point list (ACT 43). When the similarity ratio R is calculated, the processor 21 determines whether the similarity ratio R exceeds Rmax (ACT 44).

When it is determined that the similarity ratio R exceeds Rmax (YES in ACT 44), the processor 21 updates Rmax, imax, and Mmax (ACT 45). That is, the processor 21 sets Rmax=similarity ratio R, imax=i, and Mmax=M.

When Rmax, imax, and Mmax are updated, the processor increments i (ACT 46). When i is incremented, the processor 21 determines whether i exceeds Nm (ACT 47). Here, Nm is the number of pieces of commodity information registered in the dictionary.

When it is determined that i is equal to or less than Nm (NO in ACT 47), the processor 21 returns to ACT 42.

When it is determined that i exceeds Nm (YES in ACT 47), the processor 21 determines whether or not Rmax exceeds the threshold value Rthr (ACT 48). When it is determined that Rmax exceeds the threshold value Rthr (YES in ACT 48), the processor 21 recognizes the commodity of the i-th commodity information (ACT 49).

When the commodity of the i-th commodity information is recognized, the processor 21 deletes the feature point information in the commodity area of the commodity from the feature point list (ACT 50). When the feature point information is deleted, the processor 21 returns to the ACT 41.

When it is determined that Rmax is equal to or less than the threshold value Rthr (NO in ACT 48), the processor 21 ends the operation.

In a case where the similarity ratio R exceeds the threshold value Rthr, the processor 21 may recognize the commodity of the feature point set having the similarity ratio R.

The checkout device 1 may not perform settlement processing. For example, the checkout device 1 may transmit information (e.g., commodity code and the like) indicating the recognized commodity to the external device.

Also, the commodity need not be rectangular. The commodity information may include information on a line indicating the outer shape of the commodity as outer shape information.

The checkout device configured as described above recognizes the commodity using identification information such as the barcode. In addition, the checkout device specifies the commodity area in which the commodity is taken based on the feature point information. As a result, the checkout device can appropriately specify the commodity area.

The checkout device recognizes the article based on the feature point information outside the commodity area. As a result, the checkout device can recognize the article by appropriately excluding the feature point information of the already recognized commodity. Accordingly, the checkout device can appropriately recognize the article.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An article recognition device comprising:
a table;
a camera configured to capture an image of a predetermined area on the table;
a memory that stores dictionary information indicating a predetermined set of feature points of each of a plurality of articles; and
a processor configured to:
extract a plurality of feature points of the articles shown in the captured image,
identify a first article by reading identification information included in the captured image,
acquire the predetermined set of feature points of the identified first article from the stored dictionary information,
specify an article area of the first article in the captured image based on the extracted feature points and the predetermined set of feature points,
remove one or more feature points within the specified article area from the extracted feature points, and
recognize a second article, identification information of which is not included in the captured image, based on the extracted feature points where the feature points within the specified article area have been removed and the predetermined set of feature points of the second article stored in the dictionary information.

2. The device according to claim 1, wherein
the memory stores outer shape information indicating an outer shape of each article, and
the processor is further configured to:
acquire the outer shape information about the identified first article from the memory, and
specify the article area of the first article further based on the acquired outer shape information.

3. The device according to claim 1, further comprising:
a display, wherein
the processor controls the display to output an error in a case where the identification information about the first article is detected outside the specified article area of the first article in the captured image.

4. The device according to claim 1, wherein the identification information is a barcode.

5. The device according to claim 1, wherein the processor is configured to specify the article area by identifying the extracted feature points corresponding to the predetermined set of feature points of the first article.

6. The device according to claim 5, wherein
the processor is further configured to:
calculate a similarity of the predetermined set of feature points of the first article and the extracted feature points corresponding to the predetermined set of feature points, and
when the similarity exceeds a threshold value, specify the article area of the first article from the captured image.

7. The device according to claim 6, wherein the similarity is calculated by using a transformation matrix for transforming coordinates indicating the predetermined set of feature points of the first article to coordinates indicating the extracted feature points corresponding to the predetermined set of feature points.

8. The device according to claim 1, wherein the processor is further configured to detect that the articles are placed on the table by a signal transmitted from the table or the camera.

9. The device according to claim 8, wherein the processor extracts the feature points from the capture image when detecting the transmitted signal.

10. The device according to claim 1, wherein the processor is configured to perform a settlement of the identified first article and the recognized second article.

11. A method carried out by an article recognition device, the method comprising:
capturing an image of a predetermined area on a table;
extracting a plurality of feature points of a plurality of articles shown in the captured image;
identifying a first article by reading identification information included in the captured image;
acquiring a predetermined set of feature points of the identified first article from dictionary information stored in a memory;
specifying an article area of the first article in the captured image based on the extracted feature points and the predetermined set of feature points; and
removing one or more feature points within the specified article area from the extracted feature points, and
recognizing a second article, identification information of which is not included in the captured image, based on the extracted feature points within the specified article area have been removed and the predetermined set of feature points of the second article stored in the dictionary information.

12. The method according to claim 11, wherein
the memory stores outer shape information indicating an outer shape of each article,
the method further comprises acquiring the outer shape information about the identified first article from the memory, and
the article area of the first article is specified further based on the acquired outer shape information.

13. The method according to claim 11, further comprising:
outputting an error on a display in a case where the identification information about the first article is detected outside the specified article area of the first article in the captured image.

14. The method according to claim 11, wherein the identification information is a barcode.

15. The method according to claim 11, wherein the specifying the article area comprises identifying the extracted feature points corresponding to the predetermined set of feature points of the first article.

16. The method according to claim 15, further comprising:
calculating a similarity of the predetermined set of feature points of the first article and the extracted feature points corresponding to the predetermined set of feature points, wherein
when the similarity exceeds a threshold value, the article area of the first article is specified from the captured image.

17. The method according to claim 16, wherein the similarity is calculated by using a transformation matrix for transforming coordinates indicating the predetermined set of feature points of the first article to coordinates indicating the extracted feature points corresponding to the predetermined set of feature points.

18. The method according to claim 11, further comprising:

detecting that the articles are placed on the table by a signal transmitted from the table or the camera.

19. The method according to claim 18, wherein the feature points are extracted from the capture image when the transmitted signal is detected.

20. A commodity settlement device comprising:
a table;
a camera configured to capture an image of a predetermined area on the table;
a memory that stores dictionary information indicating a predetermined set of feature points of each of a plurality of articles; and
a processor configured to:
   extract a plurality of feature points of the articles shown in the captured image,
   identify a first article by reading identification information included in the captured image,
   acquire the predetermined set of feature points of the identified first article from the stored dictionary information,
   specify an article area of the first article in the captured image based on the extracted feature points and the predetermined set of feature points,
   remove one or more feature points within the specified article area from the extracted feature points,
   recognize a second article, identification information of which is not included in the captured image, based on the extracted feature points where the feature points within the specified article area have been removed and the predetermined set of feature points of the second article stored in the dictionary information, and
   perform a settlement of the identified first article and the recognized second article.

* * * * *